Jan. 6, 1959 C. VAN DER LELY ET AL 2,867,073
SIDE DELIVERY RAKE
Filed Feb. 28, 1955 3 Sheets-Sheet 1

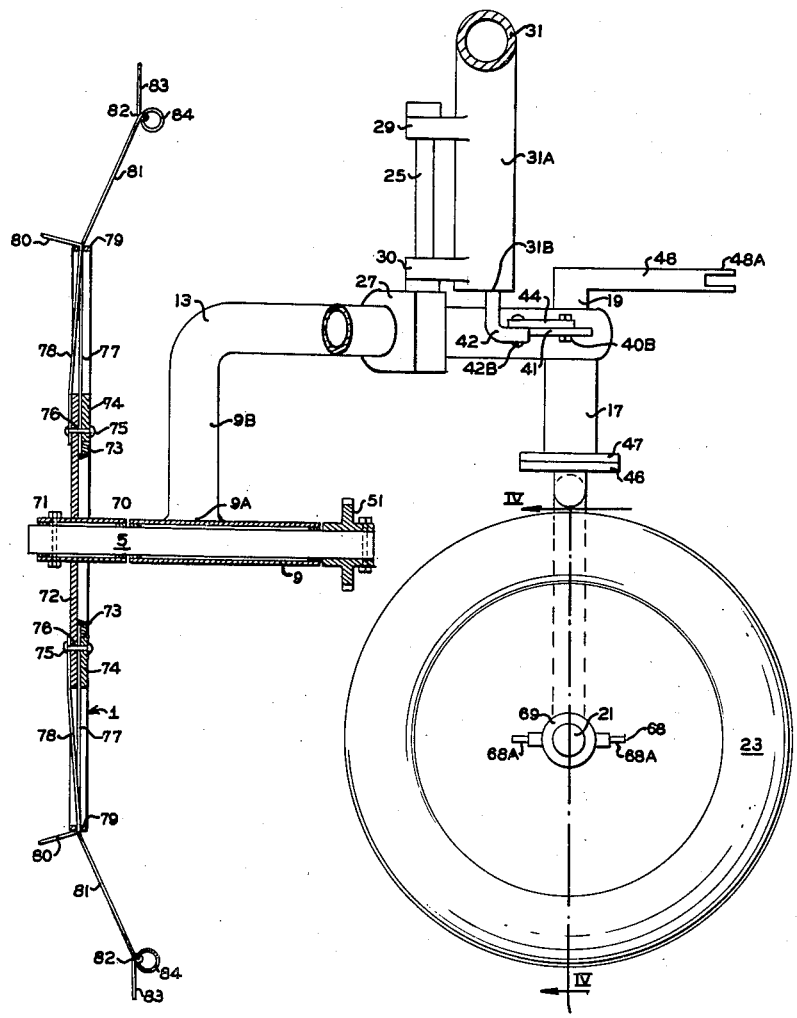

United States Patent Office 2,867,073
Patented Jan. 6, 1959

2,867,073

SIDE DELIVERY RAKE

Cornelis van der Lely and Ary van der Lely, Maasland, Netherlands, assignors to C. van der Lely, Maasland, Netherlands, a Dutch company Application February 28, 1955, Serial No. 491,150

Claims priority, application Netherlands March 5, 1954

8 Claims. (Cl. 56—377)

This invention relates to raking devices, and more particularly to raking devices using resilient raking teeth.

This invention contemplates a raking device wherein a mobile frame includes at least one horizontal axle supporting a raking member and further includes positive driving means to rotate the raking member. Moreover, the raking member is provided with teeth for displacing rakable substance on the ground, means being provided which, upon a loading of the teeth by the ground or by the rakable substance, permit a deflection of said teeth.

In regard to known resilient raking teeth upon a relatively small deflection of a tooth, the tooth loses its ability to displace rakable substance lying on the ground and instead slides over the substance.

The present invention is based on the idea that it would be of great importance to construct a rake wheel having teeth individually and substantially deflectable without losing their ability to displace rakable substances, since in this case one or more of the following advantages could be obtained:

(a) A more exact raking action, in consequence of which less material will be left behind on the terrain;

(b) Very uneven terrains can be worked effectively;

(c) For working an area of the ground of predetermined width use can be made of a device comprising a smaller number of rake wheels than in conventional rakes, which is due to the fact that each rake wheel will have a larger active working width.

According to the invention, a raking device of the kind referred to above is provided with means permitting the teeth to maintain a favorable position for raking both in the normal and in greatly deflected positions.

The invention further relates to the provision of a raking member which is suitable for use in a raking device according to the invention.

Further objects, characteristic features and details of the present invention will become evident from the following description with reference to the accompanying drawings, in which some embodiments of the invention are illustrated and in which:

Fig. 2 is an enlarged vertical section of this device along line II—II in Fig. 1;

Figures 1, 4:
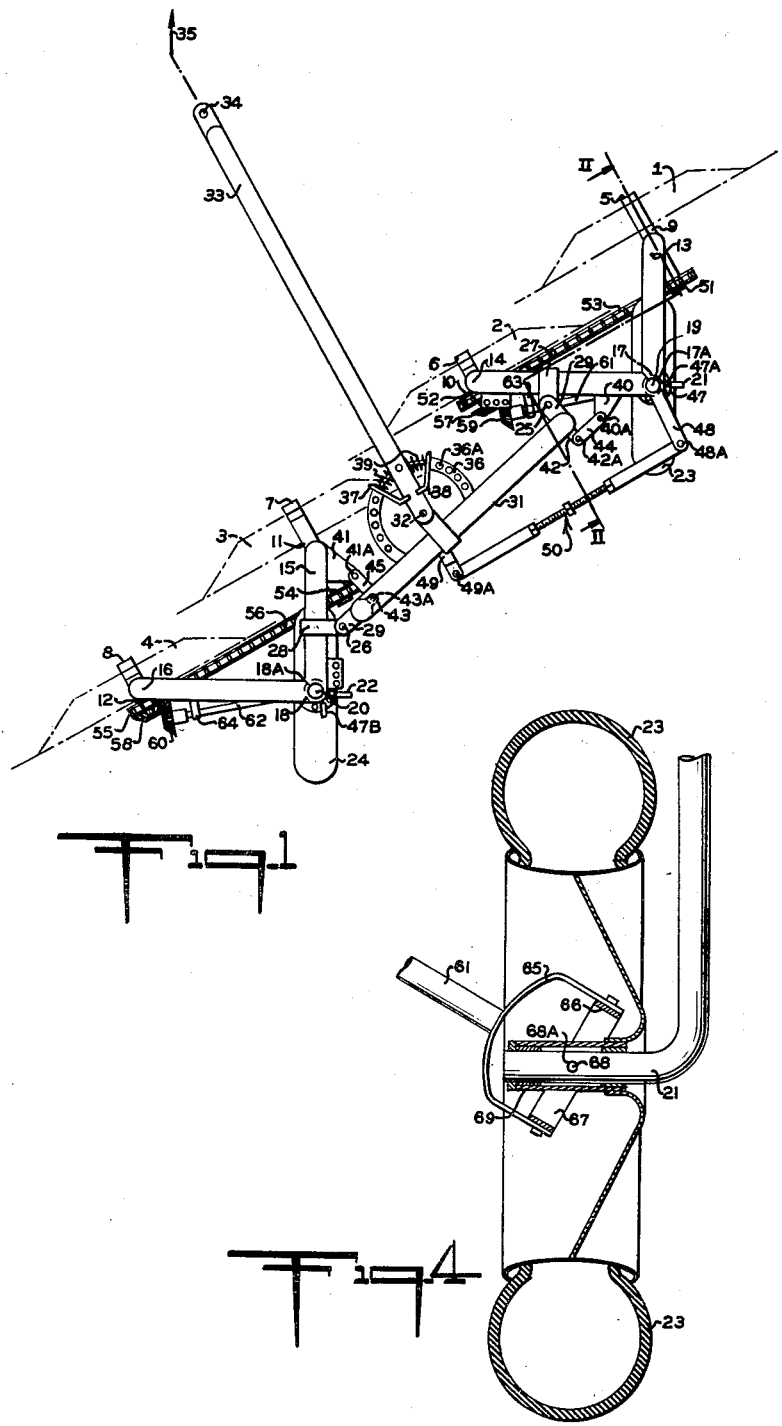
Fig. 1 is a plan view of a first embodiment of the invention.
Fig. 4 is a cross-sectional view of the running wheel of Fig. 2 taken along line IV—IV.

The side delivery rake shown in Figs. 1-4 of the drawing is provided with four raking members 1, 2, 3 and 4 which are immovably but demountably fixed upon horizontal shafts 5, 6, 7 and 8. The axles or shafts 5-8 are mounted in bearings 9, 10, 11 and 12, respectively. The bearings 9-12 are supported by the bent tubes 13, 14, 15 and 16, respectively; e. g. the bearing 9 is borne by the lower end 9A of the vertical limb 9B of the tube 13 (Fig. 2). The horizontal limbs of the tubes 13, 14 and 15, 16, respectively, are at right angles to one another and, at portions 17A and 18A where they intersect and are connected together bearings 17 and 18 are respectively provided for vertical shafts 19 and 20. The shafts 19 and 20 are integral with horizontal axles 21 and 22 of running wheels 23 and 24. To the horizontal parts of tubes 14 and 15, vertical shafts 25 and 26, respectively, are connected by means of connecting pieces 27 and 28, respectively. The shafts 25 and 26 are rotatably mounted in bearings 29 and 30 which are carried by the vertical limbs 31A of an inverted U-shaped tubular bow or mobile frame 31. To the bow 31 is connected a draw arm 33 which is rotatable about a vertical axle 32, the fore end 34 of said arm being adapted for connection to a tractor which normally travels in the direction of arrow 35.

In the position of the device shown in Fig. 1, the raking members 1–4, which are driven in the manner described hereinafter, are arranged in overlapping relation, whereby each consecutive raking member receives the material which is delivered to the left by the preceding raking member and delivers said material further to the left, in such a manner that all material coming within the reach of the members 1–4 will be disposed at the left hand side of the raking member 4.

The several parts of the device are kept in the position which is required for this operation in the following manner. On the side which is turned towards the axle 32, the upper horizontal part of the bow 31 carries a horizontal ring 36 which is provided with a series of holes 36A and 36B and which is concentric with axle 32. The arm 33 carries angularly spaced members 37 and 38 which, upon rotation of the arm 33 with regard to the bow 31 about the axle 32, slides along the ring 36. Between the members 37 and 38, two stiff springs 39 of the same size are arranged, a pin being provided between said springs and being insertable through one of the holes in the ring 36. Apart from the resiliency in the springs 39, the position of this pin determines the position of the arm 33 in relation to the bow 31.

The desired position of the tubes 14 and 15 in relation to the bow 31 is insured by horizontal flanges 40 and 41 integral with tubes 14 and 15 and by extensions 42 and 43 integral with the lower ends 31B of the limbs 31A of the bow 31. These four parts are each perforated with vertical holes 40A and 41A, whereby perforated strips 44 and 45 space flanges 40 and 41 respectively from extensions 42 and 43 by means of pins, such as the pins 40B and 42B, inserted through the perforations. In this manner, the parallel positions of the shafts 5–8 and the overlapping arrangement of the raking members 1–4 is insured.

Further, the shafts 19 and 20 are each provided, below the bearings 17 and 18, with a collar 46 facing a collar 47 on the associated bearing. Said collars are provided with a number of perforations such as 47A by which the running wheels 23 and 24 are locked in desired position with regard to the shafts 5 and 6 or 7 and 8, respectively, by means of pins, such as 47B inserted through corresponding perforations. In the arrangement of Fig. 1, the position of the running wheel 24 is defined in this manner, whereas the position of the wheel 23 is determined in a different manner, viz. by means of a horizontal arm 48 fixed immovably at the upper end of the shaft 19 and by means of an arm 49 fixedly connected by a connecting member (not shown) to the draw arm 33, but extending in opposite direction to that of said draw arm. The free ends 48A and 49A of the arms 48 and 49 are hingedly connected to the ends of a rod 50 the length of which may be adjusted at will within certain limits.

Integral with the shafts 5 and 6 are sprocket wheels 51 and 52, respectively, having an equal number of teeth, said wheels being coplanar and being coupled by a chain 53 to form part of a positive driving means. Likewise the shafts 7 and 8 carry integral sprocket wheels 54 and 55 coupled by a chain 56. A conventional form of chain drive can be employed such as, for example, shown in Patent No. 1,263,105 (Plummer, April 16, 1918). On the rearmost ends of the shafts 6 and 8 are further provided conical gear wheels 57 and 58 meshing with conical gear wheels 59 and 60 on shafts 61 and 62, respectively. The axial lines of the shafts 61 and 62, respectively, intersect the axial lines of the shafts 6 and 8 and pass through the points of intersection of the axial lines of shafts 19, 21 and 20, 22, so that the shafts 61 and 62 have inclined positions. Near the gear wheels 59 and 60, the shafts 61 and 62 are respectively mounted in bearings 63 and 64 which are integral with tubes 14 and 16, respectively. The shafts 61 and 62 are respectively coupled through a universal joint with the hubs of the running wheels 23 and 24.

Figure 4 shows, for the running wheel 23, the details of this construction which are similar for both running wheels. The downwardly inclined end of the shaft 61 terminates in a fork 65 carrying a ring 66 of a universal joint, said ring being rotatable about an axis 67 in the plane of the fork and at right angles to the shaft 61. By means of two pins 68A radially extending from the hub 69 of the running wheel 23, the ring 66 is rotatable in relation to said hub about an axis 68 at right angles to and coplanar with the axis 67. The intersection of the axes 67 and 68 always coincides with the point of intersection of the axes defined by members 6 and 21 through which also passes the axial line of the shaft 61.

A consequence of the described construction is that, upon a running of the running wheels 23 and 24 over the ground, the raking members 1, 2 and 3, 4 are respectively put into rotation which is not disturbed by small rotations of the shaft 19 in the bearing 17.

Figure 3:
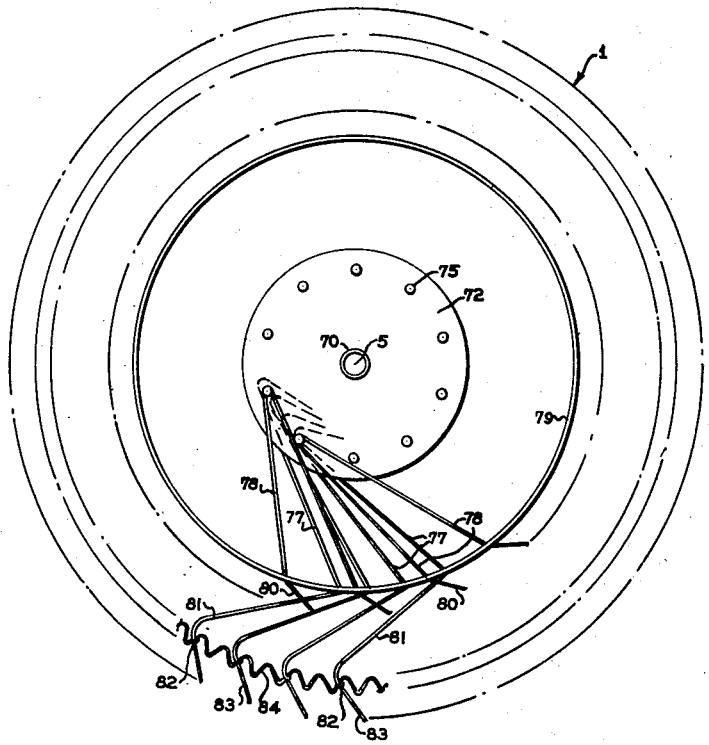
Fig. 3 is a side elevation of the raking member shown in Fig. 2.

Each of the raking members 1-4 comprises a hub 70 as illustrated in Figs. 2 and 3 and which can be fixed immovably upon the axle of the associated raking member by means of a fastening member 71, a disk 72 being concentrically fixed upon the hub 70. On the rear side of this disk, a small ring 73 is provided which serves as a centering device for a larger ring 74. The ring 74 is drawn against the disk 72 by means of ten bolts 75 passing through corresponding holes 76 in the disk and in the ring, whereby, between the disk and the ring, a number such as, for example, forty bent ends of steel wires or torsion sections 77 are clamped. Between the heads of the bolts 75 and the disk 72, U-shaped sections of ten steel wires 78 are clamped.

All of the steel wires 78 and steel wires 77 are passed through respective holes in a ring 79, each through a separate hole. Outside each hole, each wire 78 is bent forwardly with a relatively sharp bend, and the forwardly extending end of the wire constitutes a catching means 80 for the rakable substance to be displaced. The steel wires 77 are also bent outside of the holes in a relatively sharp bend both in a backwards and tangential direction.

At a distance from the ring 79, a loop 82 is formed in the intermediate part 81 of each wire 77. The end or tine portion 83 of each wire 77 adjacent to the associated loop is a ground contacting section substantially parallel to the portion of the same wire located at the inner side of the ring 79.

Finally, a helical steel wire 84 is inserted through the loops 82 in such a manner that, between two adjacent loops, two windings of the helical wire are located. The ends of the wire 84 are connected together, so that each two adjacent loops 82 are elastically connected in the endless member 84.

When the described device is drawn forward in the direction of the arrow 35, the peripheries of the raking members 1-4 are flattened at the lower sides thereof. Due to the special construction of the raking members, this flattening can be relatively large so that the raking members have a great working width. Consequently a relatively small number of raking members is capable of working a relatively wide area of the ground, since the overlapping of the raking members can be smaller than in conventional raking members. Another advantage is that each raking member can easily adapt itself to irregularities of the ground traversed without impeding the raking action.

The adaptation of a tooth 83 to ground irregularities is effected in the following manner. A tooth 83 which is subjected to a force having a component in a direction at right angles to the plane of Fig. 3 is rotated about the center line of the wire portion 77 which acts as a torsion bar, since the tooth is connected by the wire portion 81 (which may be considered as a supporting member) to the wire portion 77 (which may be considered as defining an axis of rotation). Thereby the wire portion 77 is twisted and the tooth 83 will be subsequently forced back into its original position. Due to the rotation about the axis 77, the tooth 83 will approach the axis of rotation defined, for example, by axle 5 of the raking member, so that the tooth will be able to move over projecting parts of the ground.

It is a very important advantage that in the construction described, upon deflection of the tooth, said tooth remains in a position which is favorable for a good raking action. The occurrence of large spaces between adjacent teeth, by which rakable substance might pass between adjacent teeth, is effectively prevented by the endless member 84.

While in the described construction, the means permitting deflection of the tooth is substantially constituted by the supporting member 81 and the torsion member 77, the means to keep the tooth in a favorable raking position is constituted by the same members 81 and 77, and moreover by the relatively rigid connection between the tooth 83 and the supporting member 81. As a matter of fact, by this connection the tooth remains approximately parallel to the associated member 77.

It will be evident that this connection have various degrees of rigidity.

To provide for substantial tooth deflection, it may be very important that the members 77 are spaced from the axis of rotation of the associated raking member by a substantial distance. Although other constructions are possible, a very simple construction is obtained as illustrated by making a member 77 and a supporting member 81 from a single length of steel wire. Further it is very efficient to form a tooth 84 and a supporting member 81 from a single length of steel wire.

Figure 5:
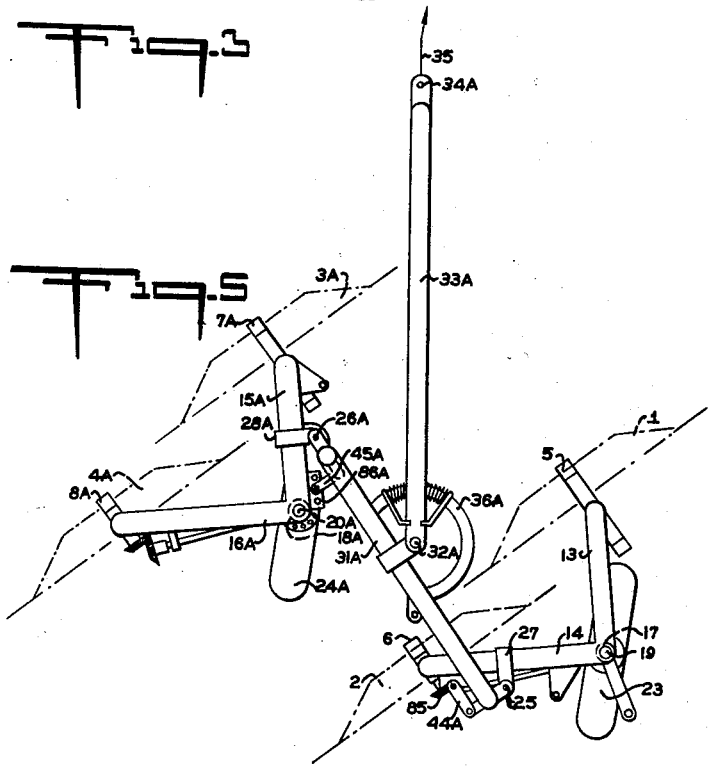
Fig. 5 is a plan view of the device illustrated in Figs. 1-3 in which the raking members are placed in different positions with regard to each other.

As shown in Fig. 5, the side delivery rake may be easily transformed into a swath turner. To this end, the strips 44, 45 are detached at one end and the rod 50 is removed. The bow 31 is placed into a new position whereat it is designated as bow 31A. The raking members 1 and 2 and the running wheel 23 substantially maintain their respective positions. The parts of the device that have been displaced are indicated by the same reference numerals as previously used to which numerals the letter A has been added. The strips 44 and 45 are fastened to strips 85 and 86A carried by the tubes 14 and 15 and the running wheels are both fixed in suitable positions.

There will now be obvious to those skilled in the art many variations of the structure set forth which do not depart essentially from the spirit of the invention as defined in the following claims.

What is claimed is:

1. A raking device comprising a mobile frame, at least one axle connected to said frame in a substantially horizontal position, a raking member on said axle and defining a plane normal to said axle, positive driving means operatively associated with and putting said raking member into rotation, and tines provided on the periphery of the raking member for displacing rakable substance on the ground, said tines each including a torsion section, a ground contacting section and an intermediate section coupling said torsion and ground contacting sections, said torsion section being connected to said raking member and defining a center line spaced from said axle, said intermediate section normally being angularly displaced relative to said plane but being pivotable on said torsion bar into said plane.

2. A raking device according to claim 1 wherein each tine further comprises a resilient connection between said ground-contacting section and said intermediate section.

3. A raking device according to claim 1, comprising resilient coupling means coupling at least two tines in the proximity of the ground-contacting sections, said coupling means enabling changes in the distances between the coupled tines.

4. A raking device according to claim 1, comprising coupling means coupling the torsion sections of at least two tines, said coupling means coupling said sections with play for enabling changes in the distances between the tines.

5. A raking device according to claim 1, in which the sections of each tine are constituted by a single piece of wire.

6. A raking member for a raking implement comprising an axle, a wheel rotatably mounted on said axle and defining a plane normal thereto, and a plurality of tines mounted on said wheel; each of said tines comprising a torsion section connected to said wheel and having a center line spaced from said axle, a ground-contacting section, and an intermediate section coupling said ground-contacting and torsion sections and normally disposed at an angle with respect to said plane, said intermediate section being pivotable into the plane of the wheel with said tine contacting the ground and due to the twisting of said torsion member about its center line, said tines thereby accommodating irregularities in the ground.

7. A raking member according to claim 6 comprising a rim defining apertures, the torsion sections extending through said apertures and constituting supporting means for said rim.

8. A raking member according to claim 7 comprising a hub defining radial apertures and coupled to said axle, said torsion sections extending through said apertures in said hub and through the apertures of said rim and engaging the intermediate sections of said tines.

References Cited in the file of this patent

UNITED STATES PATENTS

| | | |
|---|---|---|
| 468,382 | Beck | Feb. 9, 1892 |
| 720,098 | Bamford | Feb. 10, 1903 |
| 2,158,299 | Oppenheim | May 16, 1939 |
| 2,497,717 | Bowman | Feb. 14, 1950 |
| 2,508,454 | Goodwin | May 23, 1950 |
| 2,657,519 | Hill | Mar. 3, 1953 |
| 2,680,343 | Enos | June 8, 1954 |
| 2,712,723 | Ryan | July 12, 1955 |

FOREIGN PATENTS

| | | |
|---|---|---|
| 674,797 | Great Britain | July 2, 1952 |
| 680,537 | Great Britain | Oct. 8, 1952 |